(12) United States Patent
Ueda et al.

(10) Patent No.: US 12,159,974 B2
(45) Date of Patent: Dec. 3, 2024

(54) CYLINDRICAL SECONDARY BATTERY

(71) Applicant: Panasonic Intellectual Property Management Co., Ltd., Osaka (JP)

(72) Inventors: Tomohiro Ueda, Osaka (JP); Seiichi Aoki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 743 days.

(21) Appl. No.: 16/651,945

(22) PCT Filed: Sep. 27, 2018

(86) PCT No.: PCT/JP2018/036023
§ 371 (c)(1),
(2) Date: Mar. 27, 2020

(87) PCT Pub. No.: WO2019/065871
PCT Pub. Date: Apr. 4, 2019

(65) Prior Publication Data
US 2020/0313241 A1   Oct. 1, 2020

(30) Foreign Application Priority Data

Sep. 29, 2017  (JP) ................................ 2017-191954

(51) Int. Cl.
*H01M 10/0587* (2010.01)
*H01M 50/417* (2021.01)
(Continued)

(52) U.S. Cl.
CPC ..... *H01M 10/0587* (2013.01); *H01M 50/417* (2021.01); *H01M 50/426* (2021.01); *H01M 50/457* (2021.01)

(58) Field of Classification Search
CPC ........... H01M 10/0587; H01M 50/411; H01M 50/449
(Continued)

(56) References Cited

U.S. PATENT DOCUMENTS

| 2001/0004502 A1 | 6/2001 | Nakamizo et al. |
| 2003/0072993 A1 | 4/2003 | Kim et al. |

(Continued)

FOREIGN PATENT DOCUMENTS

| CN | 1801507 A | 7/2006 |
| CN | 101785137 A | 7/2010 |

(Continued)

OTHER PUBLICATIONS

Kin (translation) (Year: 2003).*
(Continued)

*Primary Examiner* — Matthew T Martin
*Assistant Examiner* — Paul Christian St Wyrough
(74) *Attorney, Agent, or Firm* — Rimon P.C.

(57) ABSTRACT

An aspect of the present invention relates to a cylindrical secondary battery including a bottomed cylindrical battery case having an opening, an electrode group, an electrolyte solution, the electrode group and the electrolyte solution being housed in the battery case, and a sealing member blocking the opening of the battery case. The electrode group includes a positive electrode, a negative electrode, and a separator placed between the positive electrode and the negative electrode and is formed by winding the positive electrode and the negative electrode with the separator therebetween. The negative electrode includes a negative electrode current collector and a negative electrode mix layer formed on at least one principal surface of the negative electrode current collector. The positive electrode includes a positive electrode current collector and a positive electrode (Continued)

mix layer formed on at least one principal surface of the positive electrode current collector. The separator includes an inner non-contact region which is located on the inner peripheral side of the electrode group and which has both surfaces that are in contact with none of the negative electrode mix layer and the positive electrode mix layer. The length of the inner non-contact region is 5% or more of the length of the separator in a winding direction of the electrode group. According to the present invention, a compact cylindrical battery with particularly excellent charge-discharge cycle characteristics in association with quick charge can be provided.

15 Claims, 10 Drawing Sheets

(51) Int. Cl.
*H01M 50/426* (2021.01)
*H01M 50/457* (2021.01)

(58) Field of Classification Search
USPC .......................................................... 429/94
See application file for complete search history.

(56) References Cited

U.S. PATENT DOCUMENTS

| 2006/0154139 | A1 | 7/2006 | Fujikawa et al. |
| 2010/0233524 | A1 | 9/2010 | Hina et al. |
| 2010/0233525 | A1 | 9/2010 | Kaiduka et al. |
| 2015/0357679 | A1 | 12/2015 | Sano et al. |

FOREIGN PATENT DOCUMENTS

| CN | 101834308 A | | 9/2010 | |
| CN | 102820452 B | * | 8/2016 | .......... H01M 10/286 |
| JP | H06-150973 A | | 5/1994 | |
| JP | 2001176482 A | * | 6/2001 | ........ H01M 10/0525 |
| JP | 2003123829 A | * | 4/2003 | ........ H01M 10/0431 |
| JP | 3732584 B2 | * | 1/2006 | |
| JP | 2008226500 A | * | 9/2008 | |
| JP | 2010-067450 A | | 3/2010 | |
| JP | 2010055753 A | * | 3/2010 | |
| JP | 2013025912 A | * | 2/2013 | |
| JP | 2013143224 A | * | 7/2013 | |
| WO | 2014-132660 A1 | | 9/2014 | |
| WO | WO-2017010046 A1 | * | 1/2017 | ........ H01M 10/0431 |

OTHER PUBLICATIONS

Okuda (translation) (Year: 2013).*
Shiori (translation) (Year: 2001).*
Kazuo (translation) (Year: 2013).*
WO 2017010046 A1 machine translation (Year: 2017).*
JP-2008226500-A (machine translation) (Year: 2008).*
JP 2010055753 A (machine translation) (Year: 2010).*
CN 102820452 B(machine translation) (Year: 2016).*
JP-3732584-B2 (tranlsation) (Year: 2006).*
International Search Report issued Jan. 8, 2019 in International Application No. PCT/JP2018/036023, with partial English translation.
Chinese Office Action with its partial English translation issued in the corresponding Chinese Patent Application No. 201880063408.X, mailed Sep. 26, 2022.

* cited by examiner

CYLINDRICAL SECONDARY BATTERY

This application is the U.S. National Phase under 35 U.S.C. § 371 of International Patent Application No. PCT/JP2018/036023, filed on Sep. 27, 2018, which in turn claims the benefit of Japanese Patent Application No. 2017-191954, filed on Sep. 29, 2017, the entire disclosures of which are incorporated herein by reference.

TECHNICAL FIELD

The present invention relates to a cylindrical secondary battery including a wound electrode group.

BACKGROUND ART

Applications of devices including batteries are increasing. In particular, lithium ion secondary batteries have light weight, high capacity, and high power and therefore are being widely used as power supplies for driving notebook personal computers, mobile phones, or other portable electronic devices. In such a use, lithium ion secondary batteries which have a battery diameter of about 14 mm to 18 mm, a height of about 40 mm to 65 mm and which have high capacity have hitherto been widely used.

In a high-capacity lithium ion secondary battery, a wound electrode group obtained by winding a positive electrode and a negative electrode with a separator therebetween is used (Patent Literature 1).

CITATION LIST

Patent Literature

PTL 1: International Publication No. 2014/132660

SUMMARY OF INVENTION

Technical Problem

In a high-capacity lithium ion secondary battery, a large amount of an electrolyte solution is used in a charge-discharge reaction. Therefore, the electrolyte solution is likely to become short by repeating charge and discharge. In a secondary battery including a wound electrode group with a large size, the curvature of the inner peripheral side of the electrode group is small. Therefore, even in the inner peripheral side thereof, the retentivity of the electrolyte solution is high and the shortage of the electrolyte solution is unlikely to occur.

On the other hand, in recent years, as portable electronic devices have further reduced in size and increased in functionality, demands for high-capacity and/or high-power compact power supplies are increasing. In a small-sized cylindrical secondary battery (hereinafter referred to as a pin-type battery in some cases) used as such a compact power supply, the curvature of the inner peripheral side of the electrode group is large. Therefore, the retentivity of an electrolyte solution on the inner peripheral side thereof is likely to decrease. In particular, pin-type batteries are likely to decrease in charge-discharge cycle characteristics in association with quick charge.

Solution to Problem

An aspect of the present invention relates to a cylindrical secondary battery including a bottomed cylindrical battery case having an opening, an electrode group, an electrolyte solution, the electrode group and the electrolyte solution being housed in the battery case, and a sealing member blocking the opening of the battery case. The electrode group includes a positive electrode, a negative electrode, and a separator placed between the positive electrode and the negative electrode and is formed by winding the positive electrode and the negative electrode with the separator therebetween. The negative electrode includes a negative electrode current collector and a negative electrode mix layer formed on at least one principal surface of the negative electrode current collector. The positive electrode includes a positive electrode current collector and a positive electrode mix layer formed on at least one principal surface of the positive electrode current collector. The separator includes an inner non-contact region which is located on the inner peripheral side of the electrode group and which has both surfaces that are in contact with none of the negative electrode mix layer and the positive electrode mix layer. The length of the inner non-contact region is 5% or more of the length of the separator in a winding direction of the electrode group.

Advantageous Effects of Invention

According to the present invention, a compact cylindrical battery with particularly excellent charge-discharge cycle characteristics in association with quick charge can be provided.

Novel features of the present invention are described in the appended claims. The present invention will be better understood from the following detailed description with reference to the drawings in terms of both configurations and contents in conjunction with other objects and features of the present invention.

DESCRIPTION OF EMBODIMENTS

Figure 1A:
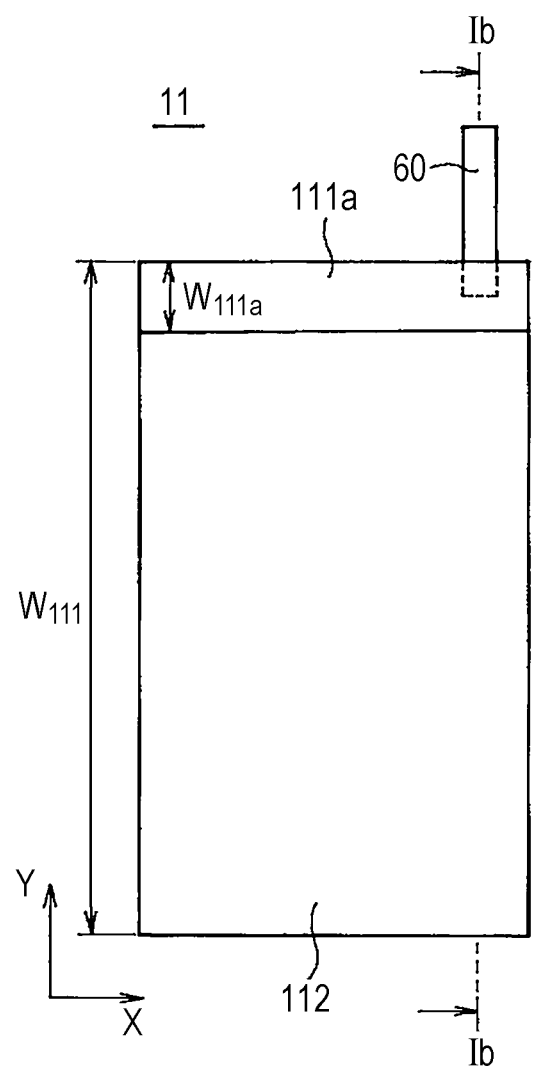
FIG. 1A is a schematic plan view of an example of a positive electrode according to an embodiment of the present invention.

A cylindrical secondary battery according to this embodiment includes a bottomed cylindrical battery case having an opening, an electrode group, an electrolyte solution, the electrode group and the electrolyte solution being housed in the battery case, and a sealing member blocking the opening of the battery case. The electrode group includes a positive electrode, a negative electrode, and a separator placed between the positive electrode and the negative electrode and is a wound electrode group (hereinafter simply referred to as an electrode group in some cases) formed by winding the positive electrode and the negative electrode with the separator therebetween.

In a pin-type battery, the amount of an electrolyte solution (a liquid electrolyte) contained in the inner peripheral side of an electrode group is extremely small as compared to that in the outer peripheral side thereof after repeating charge and discharge. The uneven distribution of the electrolyte solution on the outer peripheral side is particularly significant in a case where charge and discharge associated with quick charge are repeated. This is probably because the balance between charge and discharge is likely to be disrupted in a case where, among charge and discharge, charge is performed quickly (at high rate).

Therefore, in this embodiment, the whole surfaces of the separator are in contact with no mix layers, the separator is provided with a region (non-contact region) of which both surfaces are in contact with none of a negative electrode mix layer and a positive electrode mix layer, and at least one portion of the non-contact region is placed on the inner peripheral side of the electrode group. That is, the separator according to this embodiment includes the non-contact region (inner non-contact region), which is placed on the inner peripheral side of the electrode group. This configuration enables the inner peripheral side of the electrode group to always hold a sufficient amount of the electrolyte solution. Thus, good cycle characteristics are obtained even in a case where charge and discharge associated with quick charge are repeated.

In usual, non-contact regions of separators that are in contact with no mix layers do not contribute to any battery reaction. Therefore, from the viewpoint of the battery capacity, it is desirable that the non-contact regions are as small as possible. In, for example, a cylindrical secondary battery, the length of a non-contact region in a winding direction of an electrode group is less than 5% of the length of a separator in the winding direction. On the other hand, from the viewpoint of increasing the retentivity of an electrolyte solution on the inner peripheral side of the electrode group, it is extremely effective to consciously upsize an inner non-contact region placed on the inner peripheral side of the electrode group.

When an electrolyte solution is likely to be held on the inner peripheral side of an electrode group, the drying up of a negative electrode is suppressed particularly on the inner peripheral side even in a case where charge and discharge associated with a quick charge are repeated, thereby enhancing cycle characteristics. Since the drying up of the negative electrode is suppressed, metallic lithium is unlikely to dendritically precipitate on the negative electrode. Therefore, the stress due to the expansion and contraction of the negative electrode is small and the buckling of the electrode group is reduced. Furthermore, in the inner peripheral side, of which the curvature is large, the separation between a negative electrode current collector and negative electrode mix layer forming the negative electrode is reduced.

The quick charge refers to a charging at a current of 0.75 C or more (high rate). The value of current is not particularly limited. According to this embodiment, cycle characteristics are enhanced even in a case where charge is performed at, for example, 3 C or more. One coulomb is the value of current at which the discharge of the capacity corresponding to a nominal capacity is completed in one hour when a secondary battery is discharged at a constant current. Incidentally, discharge may be performed at high rate.

First, components of the cylindrical secondary battery are described in detail. Incidentally, this embodiment exemplifies, but is not limited to, a cylindrical lithium ion secondary battery.

(Separator)

The separator includes a base layer.

The base layer has high ionic permeability and also has, for example, adequate mechanical strength and insulating properties. As the base layer, a separator for use in lithium ion secondary batteries can be used without particular limitations. Examples of the base layer include microporous membranes, woven fabrics, and/or nonwoven fabrics. The base layer may be a single layer or a composite layer or may have a multilayer structure. The base layer may contain a type of material or two or more types of materials.

As material of the base layer, resin materials including polyolefin resins such as polypropylene and polyethylene, polyamide resins, and/or polyimide resins can be exemplified. The base layer may be a microporous membrane containing a polyolefin resin in terms of having excellent durability and a so-called shutdown function that pores are blocked when being heated to a certain temperature.

The thickness of the base layer is not particularly limited and may be selected from the range of, for example, 5 μm to 300 μm. The thickness of the base layer may be 5 μm to 40 μm or 5 μm to 30 μm.

A resin layer containing resin having swelling properties for the electrolyte solution may be formed on at least one principal surface (first principal surface) of the base layer. The resin layer absorbs and holds the electrolyte solution. Therefore, the retentivity of the electrolyte solution by the separator further increases. In particular, forming the resin layer in the inner non-contact region increases the retentivity of the electrolyte solution on the inner peripheral side of the electrode group, thereby further enhancing cycle characteristics. The resin layer is wound together with the base layer to form a portion of the electrode group. In this case, the resin layer may be in contact with a portion of the negative electrode mix layer and the positive electrode mix layer.

From the viewpoint of reducing the partial shortage of the electrolyte solution, the resin layer may be continuously formed on a region accounting for 90% or more of the area of the first principal surface and is preferably formed over the first principal surface. The resin layer may be formed on both the first principal surface of the base layer and a principal surface (second principal surface) opposite thereto within the above range.

The thickness of the resin layer is not particularly limited and may be appropriately selected from the range of 10 nm to 5,000 nm. The thickness of the resin layer may be 50 nm to 3,000 nm or 100 nm to 2,000 nm.

A swellable resin has a degree of swelling of, for example, 20% or more for the electrolyte solution. The degree of swelling thereof may be 20% to 200% or 100% to 150%.

The degree of swelling is measured as described below.

First, the swellable resin is dissolved in an organic solvent, whereby a resin solution is prepared. The resin solution is applied to a surface of flat glass and an obtained wet film is dried, whereby a sheet with a thickness of 100 μm is prepared. The sheet is cut to a size of 10 mm×10 mm, whereby a sample is obtained. On the other hand, ethylene carbonate (EC) and ethyl methyl carbonate (EMC) are mixed at a volume ratio of 1:1 and LiPF$_6$ is dissolved in a solvent mixture thereby obtained at a concentration of 1 mol/L, whereby an electrolyte solution is prepared. The electrolyte solution is poured in an airtight container. The sample is immersed in the electrolyte solution for 24 hours with the temperature of the electrolyte solution maintained at 25° C. The degree of swelling is determined in accordance with the following equation as the rate of increase in mass (H) of the sample immersed in the electrolyte solution with respect to the mass (G) of the sample unimmersed in the electrolyte solution:

Degree of swelling (%)={($H$–$G$)/$G$}×100.

The swellable resin is, for example, a fluorocarbon resin. Examples of the fluorocarbon resin include resins containing a hexafluoropropylene (HFP) unit, a vinylidene fluoride (VdF) unit, or a tetrafluoroethylene (TFE) unit. The fluorocarbon resin may be (A) a copolymer of HFP and VdF, (B) a copolymer of HFP and TFE, or (C) a copolymer of VdF and TFE. In Copolymers (A) and (B), the content of the HFP unit may be 3% by mole to 20% by mole of the total amount of each copolymer or 5% by mole to 10% by mole. In this case, the degree of swelling of the swellable resin is likely to be 20% or more.

The number-average molecular weight of the swellable resin is not particularly limited and may be, for example, 10,000 to 2,000,000 or 200,000 to 500,000. In this case, the adhesion between the resin layer and the negative electrode mix layer and/or the positive electrode mix layer is likely to increase and therefore the delamination of each mix layer is likely to be suppressed even in a case where charge and discharge are repeated.

The resin layer can be formed in such a manner that, for example, a coating solution is prepared by dissolving the swellable resin in an organic solvent, the coating solution applied to at least one portion of the first principal surface of the base layer, and a wet film thereby obtained is dried. An application method is not particularly limited. Examples of the application method include screen coating, die coating, comma coating, roll coating, bar coating, gravure coating, curtain coating, spray coating, air-knife coating, reverse coating, dip coating, and dip-squeeze coating.

(Positive Electrode)

The positive electrode, which is included in the electrode group, includes a positive electrode current collector and the positive electrode mix layer, which is placed on at least one principal surface of the positive electrode current collector.

The positive electrode current collector may be metal foil such as aluminum foil and/or aluminum alloy foil. The thickness of the positive electrode current collector is not particularly limited and may be 10 μm to 50 μm from the viewpoint of downsizing batteries and the viewpoint of the strength of the positive electrode current collector.

The positive electrode mix layer may be formed on one surface of the positive electrode current collector or may be formed on both surfaces thereof from the viewpoint of high capacity. Incidentally, in the wound electrode group, the positive electrode mix layer may be formed on one surface for the purpose of avoiding such a state that the positive electrode mix layer does not face the negative electrode mix layer at the winding start and/or the winding end.

The thickness of the positive electrode mix layer (the positive electrode mix layer formed on one surface of the positive electrode current collector) may be 20 μm to 100 μm or 30 μm to 70 μm. The total thickness of the positive electrode may be 80 μm to 180 μm.

The positive electrode mix layer contains a positive electrode active material. The positive electrode active material is not particularly limited and may be material usable in lithium ion secondary batteries. Examples of the positive electrode active material include, for example, lithium transition metal oxides such as lithium cobaltate (LiCoO$_2$), lithium nickelate (LiNiO$_2$), and lithium manganate (LiMn$_2$O$_4$) and lithium composite oxides obtained by replacing a portion of Co, Ni, or Mn in these compounds with another element (a transition metal element, a representative element, and/or the like). Positive electrode active materials may be used alone or in combination.

From the viewpoint of downsizing batteries and the viewpoint of high energy density, the positive electrode active material may be a lithium composite oxide. Particular examples thereof include composite oxides represented by the general formula Li$_{x1}$Ni$_{y1}$M$^a_{1-y1}$O$_2$ (1) and/or composite oxides represented by the general formula Li$_{x2}$Ni$_{y2}$Co$_{z1}$M$^b_{1-y2-z1}$O$_2$ (2).

In Formula (1), element M$^a$ is, for example, at least one selected from the group consisting of Na, Mg, Sc, Y, Mn, Fe, Co, Cu, Zn, Al, Cr, Pb, Sb, and B; x1 and y1 satisfy, for example, 0<x1≤1.2 and 0.5<y1≤1.0, respectively; and x1 is a value varying depending on charge or discharge.

In Formula (2), element M$^b$ is, for example, at least one selected from the group consisting of Mg, Ba, Al, Al, Ti, Sr, Ca, V, Fe, Cu, Bi, Y, Zr, Mo, Tc, Ru, Ta, and W; x2, y2, and z1 are, for example, 0<x2≤1.2 (preferably 0.9<x2≤1.2), 0.3<y1≤0.9, and 0.05≤z1≤0.5, respectively; and x2 is a value varying depending on charge or discharge. In Formula (2), 0.01≤1−y2−z1≤0.3 may hold.

The positive electrode mix layer may contain a binding agent and/or a conductive agent as required. As the binding agent, one for use in lithium ion secondary batteries can be used without particular limitations. Particular examples of the binding agent include fluorocarbon resins such as polyvinylidene fluoride (PVdF), rubbery polymers such as styrene-butadiene rubber and fluorinated rubber, and/or polyacrylic acid. The amount of the binding agent in the positive electrode mix layer is, for example, one part by mass to five parts by mass with respect to 100 parts by mass of the positive electrode active material.

As the conductive agent, one for use in lithium ion secondary batteries can be used without particular limitations. Particular examples of the conductive agent include carbonaceous materials such as graphite, carbon black, and carbon fibers; metal fibers; and/or conductive organic materials. In a case where the conductive agent is used, the amount of the conductive agent in the positive electrode mix layer is, for example, 0.5 parts by mass to five parts by mass with respect to 100 parts by mass of the positive electrode active material.

The positive electrode can be formed in such a manner that positive electrode slurry containing the positive electrode active material and a dispersion medium is applied to a surface of the positive electrode current collector, is dried, and is compressed in a thickness direction. The binding agent and/or the conductive agent may be added to the positive electrode slurry. As the dispersion medium, water, an organic solvent such as N-methyl-2-pyrrolidone (NMP), and a solvent mixture of these can be used.

(Negative Electrode)

The negative electrode includes a negative electrode current collector and the negative electrode mix layer, which is placed on a portion of at least one principal surface (third principal surface) of the negative electrode current collector.

The negative electrode current collector may be metal foil such as copper foil and/or copper alloy foil. Since Cu has low resistance, high power is likely to be obtained using a negative electrode current collector containing copper.

The negative electrode mix layer may be formed only on the third principal surface of the negative electrode current collector or may be formed on the third principal surface and a principal surface (fourth principal surface) opposite thereto from the viewpoint of high capacity. As is the case with the positive electrode mix layer, in the wound electrode group, at the winding start and/or the winding end, the negative electrode mix layer may be formed only on one surface of the negative electrode current collector or regions free from the negative electrode mix layer may be formed on corresponding both surfaces of the negative electrode current collector. At the winding start and/or the winding end, the position of an end section of the negative electrode mix layer may be different between the third principal surface and the fourth principal surface.

The thickness of the negative electrode mix layer (the negative electrode mix layer formed on one surface of the negative electrode current collector) may be 20 μm to 120 μm or 35 μm to 100 μm. The total thickness of the negative electrode may be, for example, 80 μm to 250 μm.

The negative electrode mix layer contains a negative electrode active material. The negative electrode active material is not particularly limited and may be a carbon material usable in lithium ion secondary batteries. The negative electrode active material is, for example, a carbonaceous material capable of storing and releasing lithium ions. Examples of the carbonaceous material include graphite materials (natural graphite, synthetic graphite, and the like) and amorphous carbon materials.

The negative electrode mix layer may contain a binding agent and/or a thickening agent as required.

As the binding agent, one for use in lithium ion secondary batteries can be used without particular limitations and, for example, the same compound as the binding agent that may be contained in the positive electrode mix layer can be cited. These binding agents can include material (for example, PVdF) having swelling properties for the electrolyte solution. Therefore, the negative electrode mix layer itself can hold the electrolyte solution in some cases and the drying up of the negative electrode can be somewhat relieved. However, according to this embodiment, a large amount of the electrolyte solution can be held particularly on the inner peripheral side of the electrode group and therefore cycle characteristics are enhanced even in a case where charge and discharge are repeated.

As the thickening agent, a thickening agent for use in lithium ion secondary battery can be used without particular limitations. Examples of the thickening agent include cellulose ethers such as carboxymethylcellulose (CMC).

The negative electrode can be formed similarly to the positive electrode. Negative electrode slurry contains the negative electrode active material and a dispersion medium and may further contain the binding agent and/or the thickening agent as required. The dispersion medium can be appropriately selected from those exemplified for the positive electrode.

(Wound Electrode Group)

The wound electrode group is formed in such a manner that the positive electrode, the negative electrode, and the separator placed therebetween are wound using a core, followed by removing the core. In this operation, the positive electrode, the negative electrode, and the separator are wound with, for example, the negative electrode placed inside such that the first principal surface of the base layer of the separator faces the third principal surface of the negative electrode current collector. The core is columnar. Using such cores allows cylindrical electrode groups to be obtained. Incidentally, the cylindrical electrode groups include cylinder-like shapes such as a shape in which a cylinder is partly bent and a shape in which a cylinder is slightly crushed in a diameter direction thereof.

The wound electrode group according to this embodiment is further described below in detail with reference to drawings. The negative electrode current collector and/or a fixing insulating tape attached to the negative electrode current collector is placed at the outermost periphery of the electrode group according to this embodiment.

Figure 1B:
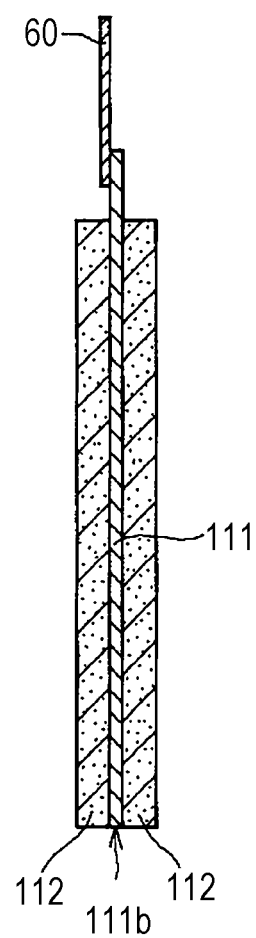
FIG. 1B is a sectional view of the positive electrode taken along the line Ib-Ib of FIG. 1A.

FIG. 1A is a schematic plan view of an example of the positive electrode. FIG. 1B is a sectional view taken along the line Ib-Ib thereof. A positive electrode 11 includes a positive electrode current collector 111 and positive electrode mix layers 112 formed on both surfaces of the positive electrode current collector 111. The positive electrode current collector 111 is rectangular and, in this embodiment, a longitudinal direction (a Y-direction in FIG. 1A) coincides with a winding axis direction. An end section (hereinafter referred to as the first end section) of the positive electrode 11 in the Y-direction is provided with a first exposed section 111a where the positive electrode current collector 111 is exposed. The first exposed section 111a is narrowly placed along the first end section. The first exposed section 111a is connected to an end section of a strip-shaped positive electrode current-collecting lead 60.

On the other hand, in another end section (hereinafter referred to as the second end section) of the positive electrode 11 in the Y-direction, the positive electrode current collector 111 is not exposed and the positive electrode mix layers 112 are placed over both surfaces except an end surface 111b of the second end section. In both end sections of the positive electrode current collector 111 in a lateral direction (an X-direction in FIG. 1A), both surfaces are entirely covered by the positive electrode mix layers 112 except end surfaces thereof and a portion corresponding to the first exposed section 111a. Incidentally, an "end surface" is a through-thickness cross section made by cutting, for example, a current collector.

The width $W_{111}$ of the positive electrode current collector 111 in the Y-direction may be selected depending on the length of the battery case or the battery capacity. The width $W_{111a}$ of the first exposed section 111a in the Y-direction may be, for example, 1 mm to 4 mm.

Figure 2A:
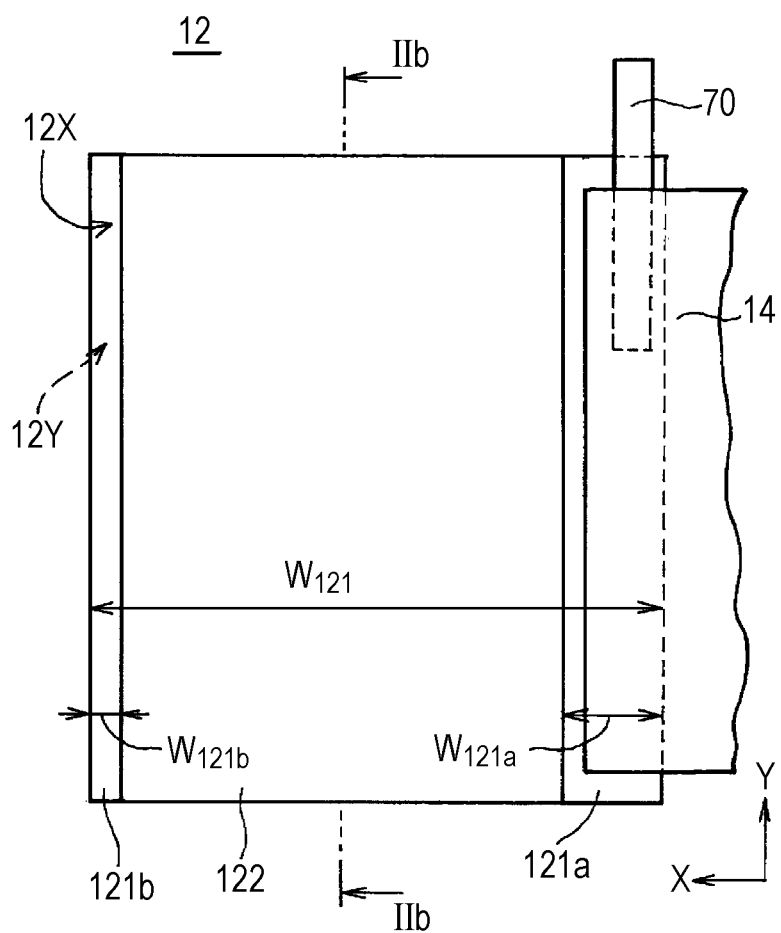
FIG. 2A is a schematic plan view of an example of a negative electrode according to an embodiment of the present invention.
Figure 2B:
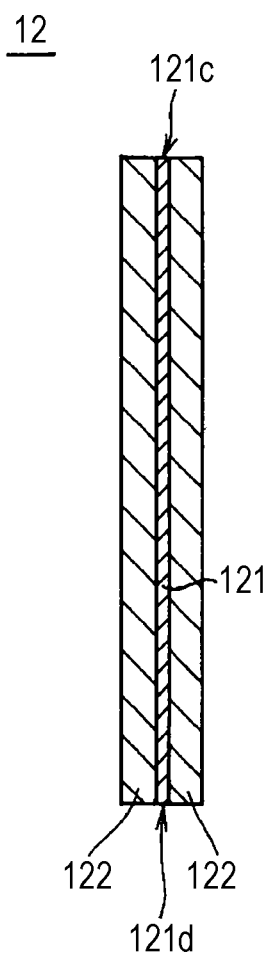
FIG. 2B is a sectional view of the negative electrode taken along the line IIb-IIb of FIG. 2A.

FIG. 2A is a schematic plan view of the negative electrode. FIG. 2B is a sectional view taken along the line IIb-IIb thereof. A negative electrode 12 includes a negative electrode current collector 121 and a negative electrode mix layer 122 formed on a portion of each of a third principal surface 12X and fourth principal surface 12Y of the negative electrode current collector 121. The negative electrode current collector 121 is rectangular such that the length thereof in the X-direction is set to be larger than the positive electrode current collector 111. An end section (hereinafter referred to as the first end section) of each of the third principal surface 12X and fourth principal surface 12Y of the negative electrode 12 in the X-direction is provided with a second exposed section 121a where the negative electrode current collector 121 is exposed. The second exposed section 121a is narrowly placed along the first end section. The second exposed section 121a is connected to an end section of a strip-shaped negative electrode current-collecting lead 70 by welding. A fixing insulating tape 14 is placed on the second exposed section 121a so as to cover a junction of the second exposed section 121a and the negative electrode current-collecting lead 70. The fixing insulating tape 14 fixes the outermost periphery of the electrode group after winding.

Another end section (hereinafter referred to as the second end section) of each of the third principal surface 12X and/or fourth principal surface 12Y of the negative electrode 12 in the X-direction is provided with a narrow third exposed section 121b where the negative electrode current collector 121 is exposed. The third exposed section 121b is placed on the inner peripheral side of the wound electrode group. Therefore, the negative electrode current collector 121 is preferably exposed at both surfaces of the third exposed section 121b. This is because an inner non-contact region 13c is likely to be wide. Incidentally, the third exposed section 121b of the third principal surface 12X may be different in size from the third exposed section 121b of the fourth principal surface 12Y. Among the above principal surfaces, for example, the third exposed section 121b of a principal surface that is located at the innermost periphery of the electrode group 10 may be smaller than the third exposed section 121b of another principal surface.

The width $W_{121a}$ of the second exposed section 121a in the X-direction is preferably a range capable of covering the outermost periphery of the electrode group 10 at least once. The width $W_{121a}$ is, for example, 10% to 50% of the width $W_{121}$ of the negative electrode current collector 121 in the X-direction. The width $W_{121b}$ of the third exposed section 121b in the X-direction is preferably a range capable of being wound about 0.3 times to twice on the inner peripheral side of the electrode group 10. The width $W_{121b}$ is, for example, 3% to 10% of the width $W_{121}$.

Both end sections of the third principal surface 12X and fourth principal surface 12Y of the negative electrode 12 in the Y-direction are covered by the negative electrode mix layers 122 except end surfaces 121c and 121d of the end sections and portions corresponding to the second exposed section 121a and the third exposed section 121b. In the fourth principal surface 12Y, the negative electrode mix layers 122 may be placed on at least one portion of a region corresponding to the second exposed section 121a and/or third exposed section 121b of the third principal surface.

Figure 3A:
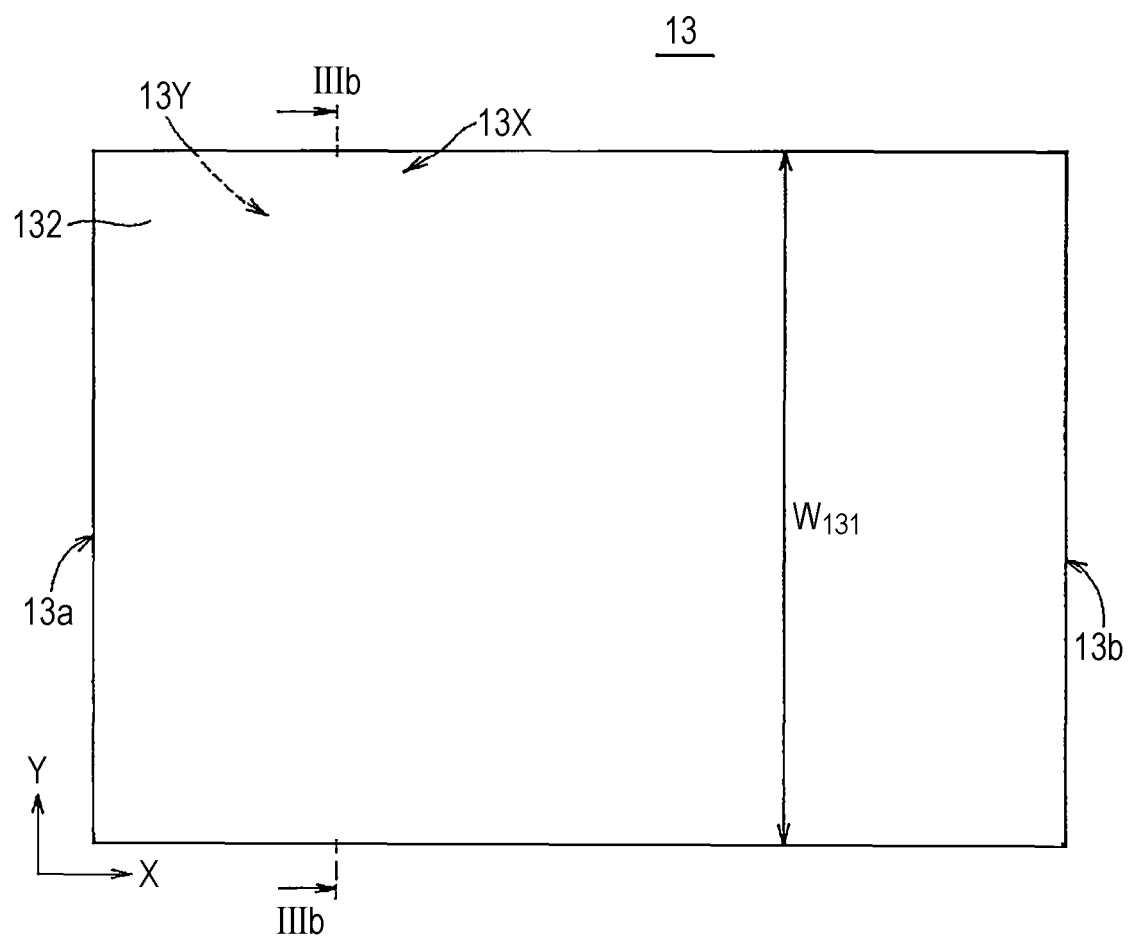
FIG. 3A is a schematic plan view of an example of a separator according to an embodiment of the present invention.
Figure 3B:
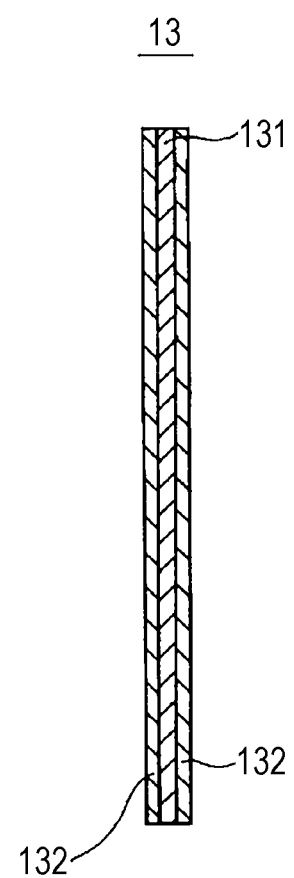
FIG. 3B is a sectional view of the separator taken along the line IIIb-IIIb of FIG. 3A.

FIG. 3A is a schematic plan view of the separator. FIG. 3B is a sectional view taken along the line IIIb-IIIb thereof. A separator 13 includes a base layer 131 and resin layers 132 formed on a first principal surface 13X and second principal surface 13Y of the base layer 131. The base layer 131 is, for example, a rectangular elongated body that the length in the X-direction is set to be larger than that of the positive electrode mix layers 112 and/or the negative electrode mix layers 122. The resin layers 132 are placed over the first principal surface 13X and the second principal surface 13Y.

Figure 4:
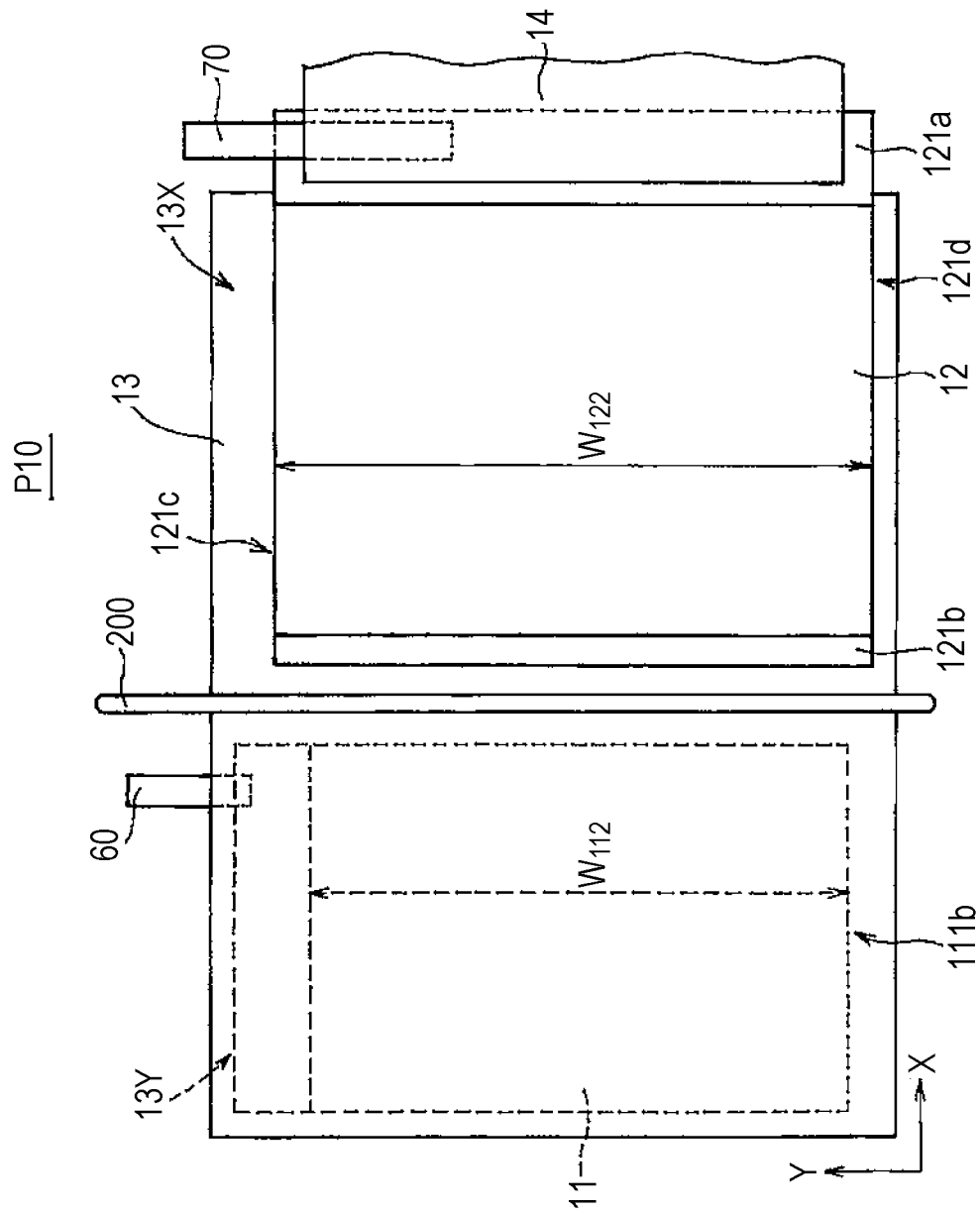
FIG. 4 is a schematic plan view showing the configuration of an unwound electrode group.

FIG. 4 is a schematic plan view showing the configuration of an unwound electrode group P10. In an illustrated example, the positive electrode 11 is placed on the left side and second principal surface 13Y side of the separator 13 and the negative electrode 12 is placed on the right side and first principal surface 13X side of the separator 13. A stack of the positive electrode 11, separator 13, and negative electrode 12 placed as described above is wound around a core 200, whereby the wound electrode group 10 is formed as shown in FIG. 5.

The width $W_{112}$ of the positive electrode mix layers 112 in the winding axis direction is slightly less than the width $W_{122}$ of the negative electrode mix layers 122 in the winding axis direction. Winding allows the positive electrode mix layers 112 to completely overlap the negative electrode mix layers 122. Both end sections of the separator 13 in the winding axis direction protrude from corresponding end sections of the positive electrode 11 and the negative electrode 12.

At least one portion of the second exposed section 121a of the negative electrode 12 protrudes from the separator 13. The protruding portion faces an inner surface of a side wall of a battery case 20 (see FIG. 7) with the fixing insulating tape 14 therebetween.

Figure 5:
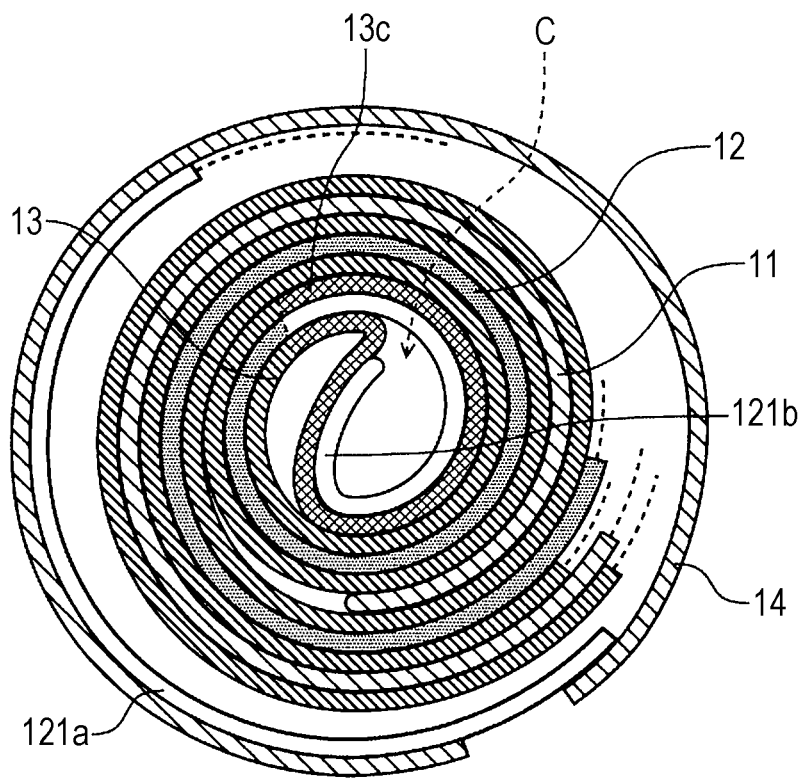
FIG. 5 is a schematic sectional view showing the configuration of a wound electrode group.

FIG. 5 is a schematic sectional view showing the configuration of the wound electrode group 10 formed by winding the electrode group P10 shown in FIG. 4. In FIG. 5, a cross section made by cutting the electrode group 10 perpendicularly to a winding axis is shown. In FIG. 5, for convenience, the positive electrode current-collecting lead 60 and the negative electrode current-collecting lead 70 are omitted and the second exposed section 121a and the third exposed section 121b are shown as hollows. In FIG. 5, the third exposed section 121b of the third principal surface 12X has the same size as the size of the third exposed section 121b of the fourth principal surface 12Y.

The length L of the inner non-contact region 13c in a winding direction accounts for 5% or more of the length Ls of the first principal surface 13X of the separator 13 in the X-direction. The length L of the inner non-contact region 13c may be 7% or more of the length Ls of the first principal surface 13X or may be 5% to 20% of the length Ls. Incidentally, the inner non-contact region 13c may be in contact with the negative electrode current collector 121.

The length L of the inner non-contact region 13c is determined from the separator 13 taken out of the electrode group 10. First, the wound electrode group 10 is developed, the negative electrode 12 and the positive electrode 11 are peeled off, and the separator 13 is taken out. Subsequently, a non-contact region of the taken out separator 13 that is in contact with none of the negative electrode mix layers 122 and the positive electrode mix layers 112 is checked. The non-contact region is a region of the separator 13 that lacks a contact mark due to either of the negative electrode mix layers 122 and the positive electrode mix layers 112. The contact mark is provided with, for example, a piece of the negative electrode mix layers 122 or the positive electrode mix layers 112 that could not be peeled off.

In a case where the electrode group P10 is wound with the core 200 placed substantially at the center of the separator 13 in the winding direction as described in this embodiment (see FIG. 4), the inner non-contact region 13c is placed near substantially the center of the separator 13. In other words, contact marks between the separator 13 and the negative electrode mix layers 122 are formed toward an end section 13a and an end section 13b, respectively, from positions which are located on both sides of one of the principal surfaces of the separator 13 with a central axis of winding (a winding axis, which is not shown) therebetween, the core 200 being placed on the central axis, and which are apart from the central axis at a predetermined distance.

Likewise, contact marks between the separator 13 and the positive electrode mix layers 112 are formed toward the end section 13a and the end section 13b, respectively, from positions which are located on both sides of the other principal surface of the separator 13 with the central axis of winding therebetween, the core 200 being placed on the central axis, and which are apart from the central axis at a predetermined distance.

The inner non-contact region 13c is a region of the separator 13 that lacks a contact mark due to either of the negative electrode mix layers 122 and the positive electrode mix layers 112. In usual, the negative electrode mix layers 122 are formed so as to have an area larger than that of the positive electrode mix layers 112. Therefore, the length L of the inner non-contact region 13c can be calculated from a principal surface of the separator 13 that is found to have contact marks due to the negative electrode mix layers 122.

Figure 6:
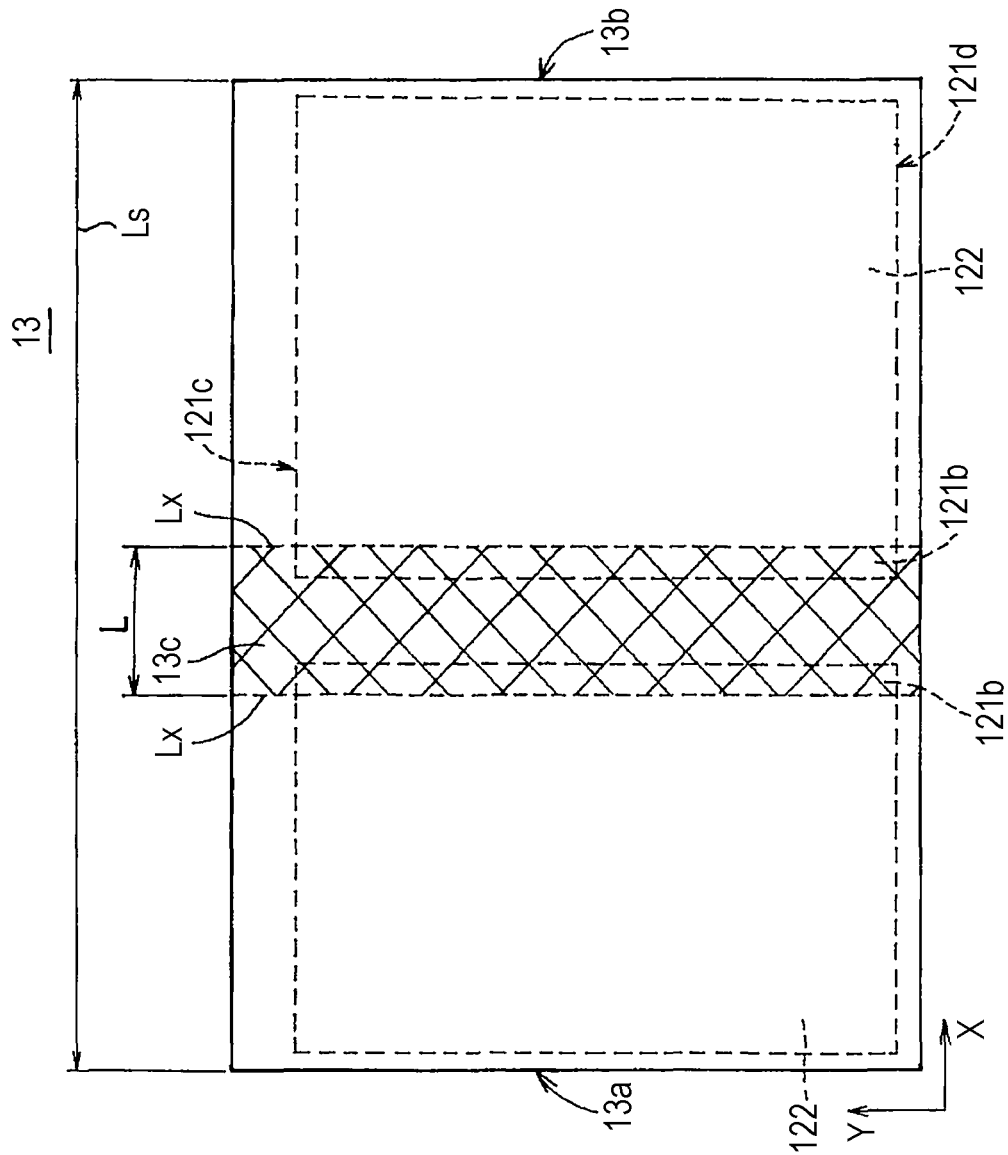
FIG. 6 is a plan view of a separator taken out in such a manner that a wound electrode group is developed.

In this embodiment, the length L of the inner non-contact region 13c can be calculated from a principal surface of the separator 13 that is found to have contact marks due to the negative electrode mix layers 122. In particular, as shown in FIG. 6, two straight lines Lx are drawn by extending end sections of two contact marks, due to the negative electrode mix layers 122, formed on the principal surface in a direction of the central axis, the end sections facing each other with the central axis therebetween. A region surrounded by the two straight lines Lx and two end sections of the separator 13 in the Y-direction is the inner non-contact region 13c. FIG. 6 is a plan view of the separator 13 taken out in such a manner that the wound electrode group 10 is developed again and the negative electrode and the positive electrode are peeled off. In FIG. 6, for convenience, the inner non-contact region 13c is doubly hatched.

The inner non-contact region 13c is formed in such a manner that the negative electrode 12, which includes the third exposed section 121b, is provided on the separator 13 and is wound as shown in, for example, FIG. 4. In this case, the third exposed section 121b is placed on the inner peripheral side of the electrode group 10. In an inner peripheral-side end section of the negative electrode 12, the separator 13 is in contact with at least one portion of the third exposed section 121b rather than the negative electrode mix layers 122. Therefore, the stress applied to end sections of the negative electrode mix layers 122 when the negative electrode mix layers 122 are wound is relieved; hence, a negative electrode mix is unlikely to fall. When the negative electrode 12 does not include the third exposed section 121b, the negative electrode 12 is wound in such a state that the negative electrode 12 is placed sufficiently apart from the core 200 as shown in, for example, FIG. 4.

From the viewpoint of suppressing drying up on the inner peripheral side of the electrode group 10, the separator 13 need not be placed on the outer peripheral side of the electrode group 10 rather than the negative electrode 12. In other words, the outside (outer peripheral side) of the separator 13 that is located on the outermost peripheral side of the electrode group 10 may be covered by the negative electrode current collector 121. That is, the separator 13 need not be exposed when the appearance of the electrode group 10 is viewed 360° in a peripheral direction.

Incidentally, the fixing insulating tape 14 and/or the negative electrode current collector 121 is placed on the outermost periphery of the electrode group 10. In a case where the battery case 20 is used as an external positive terminal, the positive electrode current collector 111 may be placed on the outermost periphery of the electrode group 10.

The electrode group 10 includes a cylindrical section C (see FIG. 5) formed by the negative electrode mix layer 122 formed on a principal surface of the wound negative electrode current collector 121 that is located innermost. The inner non-contact region 13c is placed in, for example, an inner portion of the cylindrical section C. The electrolyte solution is likely to be held in the cylindrical section C. In a pin-type battery, the diameter of the cylindrical section C is small. According to this embodiment, even when the diameter of the cylindrical section C is small, the retentivity of the electrolyte solution on the inner peripheral side of the electrode group 10 is high owing to the inner non-contact region 13c.

The cylindrical section C can be determined from the cross section made by cutting the electrode group 10 perpendicularly to the winding axis or an end surface of the electrode group 10 viewed in a direction perpendicular to the winding axis. When the wound negative electrode 12 is viewed from the above cross section or end surface, a ring (which is partly opened in a strict sense) formed by the negative electrode mix layer 122 formed on the principal surface of the negative electrode current collector 121 that is located innermost is the cylindrical section C.

The diameter of the cylindrical section C is not particularly limited and may be 2.5 mm or less, 2 mm or less, 1.5 mm or less, or 1 mm or less. The diameter of the cylindrical section C may be 0.7 mm or more or 0.8 mm or more. The diameter of the cylindrical section C means the diameter of a circle (that is, a circle having the same area as the area of the cylindrical section C in a cross section) corresponding to the cylindrical section C in a cross section perpendicular to the winding axis direction.

The diameter of the electrode group 10 is not particularly limited and may be 6 mm or less or 5 mm or less. The diameter of the electrode group 10 may be 1 mm or less or 2 mm or more. The diameter of the electrode group 10 means the diameter of a circle (that is, a circle having the same area as the area of the electrode group 10 in a cross section) corresponding to the electrode group 10 in a cross section perpendicular to the winding axis direction.

The number of turns in the electrode group 10 may be appropriately set in consideration of a desired capacity, the diameter of the electrode group 10, and the like. The number of turns in the electrode group 10 may be, for example, three to ten or three to eight. When the number of turns is within such a range, high capacity is ensured and the electrolyte solution is likely to be inhibited from being squeezed toward an outer peripheral portion because the electrode group 10 is not excessively squeezed. The number of turns is the number of laps in a portion on which the positive electrode mix layers 112 and the negative electrode mix layers 122 are wound in such a state that the positive electrode mix layers 112 face the negative electrode mix layers 122.

Figure 7:
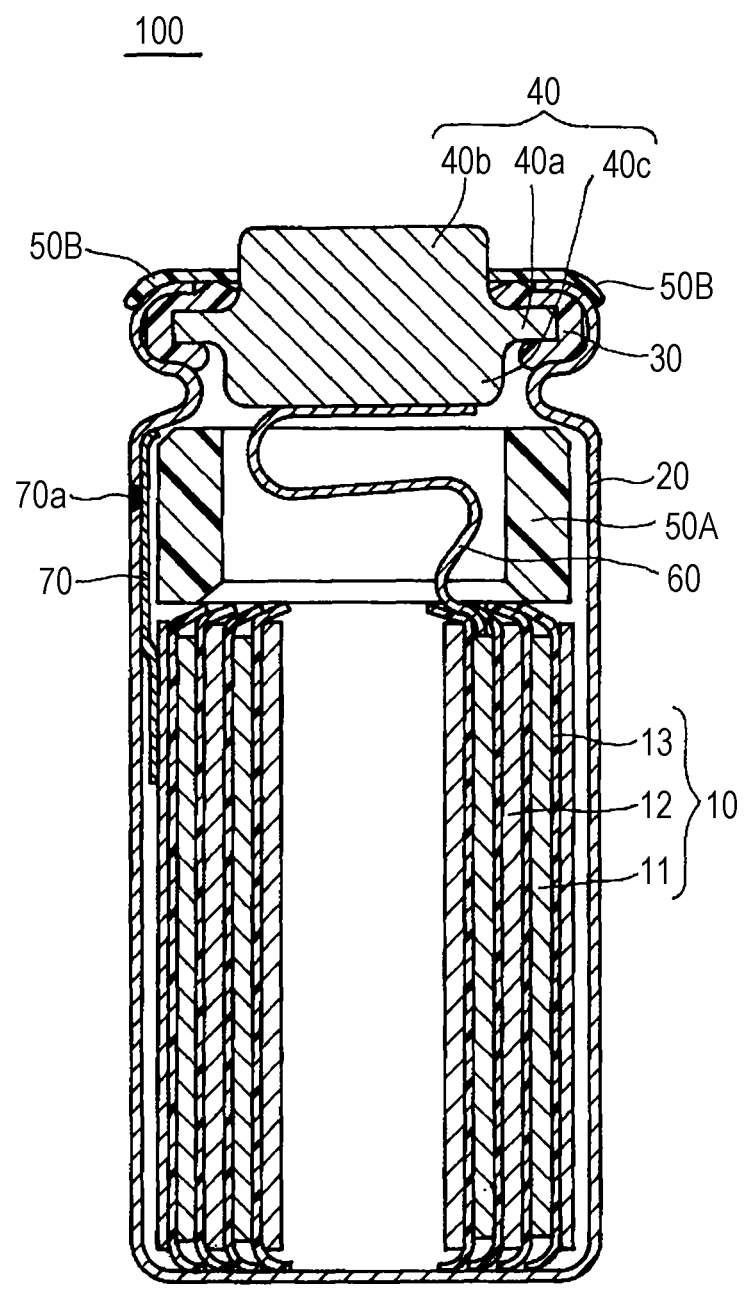
FIG. 7 is a schematic vertical sectional view of a cylindrical secondary battery according to an embodiment of the present invention.

Next, the configuration of the cylindrical secondary battery according to this embodiment is described with reference to a drawing. FIG. 7 is a schematic vertical sectional view of an example of the cylindrical secondary battery according to an embodiment of the present invention.

A cylindrical secondary battery 100 includes the battery case 20, which has an opening and a bottomed cylindrical shape; the wound electrode group 10, which is housed in the battery case 20; the electrolyte solution (not shown), which is housed in the battery case 20; and a sealing member 40 blocking the opening of the battery case 20.

The sealing member 40 is hat-shaped and includes a ring-shaped brim (brim 40a) and columnar terminal sections 40b and 40c protruding from the inner periphery of the brim 40a in thickness directions. A ring-shaped insulating gasket 30 is placed on a peripheral portion of the sealing member 40 so as to cover the brim 40a. An opening end section of the battery case 20 is swaged to the peripheral portion of the sealing member 40 with the gasket 30 therebetween by bending the opening end section inward. This allows the battery case 20 to be insulated from the sealing member 40 and also allows the battery case 20 to be sealed.

A space is situated between an upper end surface (top surface) of the electrode group 10 and the bottom surface of the sealing member 40. A first insulating ring 50A is placed in the space to restrict the contact of the electrode group 10 with the sealing member 40.

A doughnut-shaped second insulating ring 50B formed from an electrically insulating material is placed so as to cover the outer surface of the bent opening end section of the battery case 20 and a surface of the gasket 30 therearound. This effectively suppresses an external short-circuit between the sealing member 40 and the battery case 20.

The polarity of the battery case 20 and the sealing member 40 can be arbitrarily determined. That is, the battery case 20 may be either of an external positive terminal and an external negative terminal. From the viewpoint of efficiently using the volume of the battery case 20, the electrode group 10 may be formed such that an electrode having the same polarity as that of the battery case 20 is located on the outermost peripheral side of the electrode group 10. A current-collecting lead extended from an electrode (the negative electrode 12 in an illustrated example) situated on the outermost peripheral side is connected to an inner wall of the battery case 20. In the illustrated example, the battery case 20 is connected to the negative electrode 12 and is used as an external negative terminal and the sealing member 40 is connected to the positive electrode 11 and is used as an external positive terminal.

One end section of the positive electrode current-collecting lead 60 is connected to the positive electrode 11 (for example, the first exposed section 111a) by welding or the like and the other end section is connected to the bottom surface of the sealing member 40 by welding or the like through a hole formed at the center of the first insulating ring 50A. That is, the positive electrode 11 and the sealing member 40 are electrically connected to each other with the positive electrode current-collecting lead 60 therebetween and the sealing member 40 has a function as an external positive terminal.

The negative electrode current collector 121 (second exposed section 121a) is exposed on the outermost peripheral side of the electrode group 10. The second exposed section 121a faces an inside wall of the battery case 20. One end section of the negative electrode current-collecting lead 70 is connected to the second exposed section 121a by welding or the like. The other end section of the negative electrode current-collecting lead 70 is connected to the inside wall of the battery case 20 at a weld 70a. That is, the negative electrode 12 and the battery case 20 are electrically connected to each other with the negative electrode current-collecting lead 70 therebetween and the battery case 20 has a function as an external negative terminal. The weld 70a is formed on, for example, an inside wall that is closer to the opening of the battery case 20 than an upper end surface of the electrode group 10.

The outside diameter of the cylindrical secondary battery 100 is not particularly limited and may be 6.5 mm or less or 5 mm or less. The outside diameter of the cylindrical secondary battery 100 may be 1 mm or more, 2 mm or more, or 3 mm or more. The outside diameter of the cylindrical secondary battery 100 is the maximum diameter of the battery case 20.

(Battery Case)

The battery case 20 has a bottomed cylindrical shape with an opening. The wound electrode group 10 and the electrolyte solution are housed in the battery case 20.

The thickness (maximum thickness) of the bottom of the battery case 20 may be 0.08 mm to 0.2 mm or 0.09 mm to 0.15 mm. The thickness (maximum thickness) of a side wall of the battery case 20 may be 0.08 mm to 0.2 mm or 0.08 mm to 0.15 mm. Incidentally, these thicknesses are the thicknesses of the bottom and side wall of the battery case 20 in the assembled cylindrical secondary battery 100.

The battery case 20 is, for example, a metal can. As material making up the battery case 20, aluminum, an aluminum alloy (an alloy containing a minute amount of another metal such as manganese or copper or the like), iron, an iron alloy (including stainless steel), and/or the like can be exemplified. The battery case 20 may be a plated one (for example, a nickel-plated one or the like) as required. The material making up the battery case 20 can be appropriately selected depending on the polarity of the battery case 20 or the like.

(Sealing Member)

In the cylindrical secondary battery 100, the opening of the battery case 20 is sealed with the sealing member 40.

The shape of the sealing member 40 is not particularly limited. A disk shape, a shape in which a central portion of a disk protrudes in a thickness direction (a hat shape), or the like can be exemplified. The sealing member 40 may be provided with a space in the inside thereof or may be provided with no space. Hat-shaped sealing members include those having a ring-shaped brim and a terminal section protruding from the inner periphery of the brim in one of thickness directions; those having the ring-shaped brim 40a and the terminal sections 40b and 40c, which protruded from the inner periphery of the brim 40a in both of the thickness directions as described in the illustrated example; and the like. The latter have such an outer shape that two hats are stacked in such a state that brim 40a sides thereof face each other. Protruding terminal sections may have a columnar shape or a cylindrical shape having a top surface (or a top surface and a bottom surface). The sealing member 40 may be provided with a safety valve, which is not shown.

As material making up the sealing member 40, aluminum, an aluminum alloy (an alloy containing a minute amount of another metal such as manganese or copper or the like), iron, an iron alloy (including stainless steel), and/or the like can be exemplified. The sealing member 40 may be a plated one (for example, a nickel-plated one or the like). The material making up the sealing member 40 can be appropriately selected depending on the polarity of the sealing member 40 or the like.

The opening of the battery case 20 can be sealed with the sealing member 40 by a known method. Sealing may be performed using welding. Swage sealing is preferably performed in such a manner that the opening of the battery case 20 and the sealing member 40 are swaged together with the gasket 30 therebetween. Swage sealing can be performed in such a manner that, for example, the opening end section of the battery case 20 is bent inside the sealing member 40 with the gasket 30 therebetween.

(Current-Collecting Leads)

As material of the positive electrode current-collecting lead 60, for example, metal such as aluminum, titanium, or nickel; an alloy thereof; or the like is cited. As material of the negative electrode current-collecting lead 70, for example, metal such as copper or nickel, an alloy thereof, or the like is cited.

The shape of current-collecting leads is not particularly limited and may be, for example, a wire shape or a sheet shape (or a ribbon shape). The width and/or thickness of a current-collecting lead connected to the inside wall of the battery case 20 may be appropriately determined from the viewpoint of ensuring the ease of inserting the electrode group 10 into the battery case 20 and/or the strength of the current-collecting lead and/or the viewpoint of reducing the volume occupied by the current-collecting lead in the battery case 20. The width of a ribbon-shaped current-collecting lead may be 1 mm to 2 mm or 1 mm to 1.5 mm from the viewpoint of ensuring a certain degree of welding strength and the viewpoint of space saving. The thickness of the current-collecting leads may be 0.05 mm to 0.15 mm or 0.05 mm to 0.1 mm from the viewpoint of the strength of the current-collecting leads and the viewpoint of the ease of inserting the electrode group 10.

(Gasket)

The gasket 30 is located between the opening (in particular, the opening end section) of the battery case 20 and the sealing member 40 (in particular, the peripheral portion of the sealing member 40) to insulate both and has the function of ensuring the airtightness of the cylindrical secondary battery 100.

The shape of the gasket 30 is not particularly limited and the gasket 30 is preferably ring-shaped so as to cover the peripheral portion of the sealing member 40. In a case where a disk-shaped sealing member is used, the gasket 30 may be shaped so as to cover a disk-shaped periphery. In a case where a hat-shaped sealing member is used, the gasket 30 may be shaped so as to cover the periphery of a brim.

As material making up the gasket 30, an insulating material such as a synthetic resin can be used. As the insulating material, material for use in gaskets for lithium ion secondary batteries is cited without particular limitations. Particular examples of the insulating material include, for example, polyolefins such as polypropylene and polyethylene, fluorocarbon resins such as polytetrafluoroethylene and perfluoroalkoxyethylene copolymers, polyphenylene sulfide, polyether ether ketone, polyamide, polyimide, and liquid crystal polymers. These insulating materials may be used alone or in combination. The gasket 30 may contain a known additive (for example, filler such as inorganic fibers) as required.

(Electrolyte Solution)

The electrolyte solution contains, for example, a nonaqueous solvent and a solute (supporting electrolyte) dissolved in the nonaqueous solvent.

As the supporting electrolyte, a supporting electrolyte (for example, a lithium salt) for use in lithium secondary batteries can be used without particular limitations.

The concentration of the supporting electrolyte in the electrolyte solution is not particularly limited and is, for example, 0.5 mol/L to 2 mol/L.

As the supporting electrolyte (lithium salt), for example, the following salts can be used: lithium salts of fluorine-containing acids [lithium hexafluorophosphate ($LiPF_6$), lithium tetrafluoroborate ($LiBF_4$), lithium trifluoromethanesulfonate ($LiCF_3SO_3$), and the like], lithium salts of chlorine-containing acids [lithium perchlorate ($LiClO_4$) and the like], lithium salts of fluorine-containing acid imides [lithium bis(trifluoromethylsulfonyl)imide ($LiN(CF_3SO_2)_2$), lithium bis(pentafluoroethylsulfonyl)imide ($LiN(C_2F_5SO_2)_2$)), lithium bis(trifluoromethylsulfonyl)(pentafluoroethylsulfonyl)imide ($LiN(CF_3SO_2)(C_2F_5SO_2)$), and the like], and lithium salts of fluorine-containing acid methides [lithium tris(trifluoromethylsulfonyl)methide ($LiC(CF_3SO_2)_3$) and the like]. These supporting electrolytes may be used alone or in combination.

Examples of the nonaqueous solvent include cyclic carbonates (including derivatives (substituted compounds containing a substituent and the like)) such as propylene carbonate, propylene carbonate derivatives, EC, butylene carbonate, vinylene carbonate, and vinylethylene carbonate; linear carbonates such as dimethyl carbonate, diethyl carbonate (DEC), and EMC; linear ethers such as 1,2-dimethoxyethane, 1,2-diethoxyethane, trimethoxyethane, and ethyl monoglyme; cyclic ethers (including derivatives (substituted compounds containing a substituent and the like)) such as tetrahydrofuran, 2-methyltetrahydrofuran, tetrahydrofuran derivatives, dioxolane, and dioxolane derivatives; lactones such as γ-butyrolactone; amides such as formamide, N,N-dimethylformamide, and acetamide; nitriles such as acetonitrile and propylnitrile; nitroalkanes such as nitromethane; sulfoxides such as dimethyl sulfoxide; and sulfolane compounds such as sulfolane and methylsulfolane. These may be used alone or in combination.

(Insulating Rings)

The first insulating ring 50A is placed between an upper portion of the electrode group 10 and the sealing member 40.

The second insulating ring 50B is placed on the periphery of the sealing member 40.

As each insulating ring, one for use in lithium ion secondary batteries can be used without particular limitations. Material of the insulating ring is not particularly limited, may be an insulating material, and may be appropriately selected from those exemplified as the material of the gasket.

The configuration of the cylindrical secondary battery 100, the composition of the electrolyte solution, and the like are not limited to the above examples and a known configuration and composition can be appropriately selected.

The present invention is described below in detail with reference to examples and comparative examples. The present invention is not limited to the examples below.

[Evaluation]

Batteries of the examples and the comparative examples were evaluated as described below.

(1) Cycle Characteristics

Six batteries prepared in each example were measured for initial discharge capacity by a procedure below.

After each battery was charged at a constant current of 3 C until the closed-circuit voltage of the battery reached 4.35 V, the battery was discharged at a constant current of 1 C until the closed-circuit voltage of the battery reached 3 V. In the charge and discharge, the discharge voltage during discharge was monitored, the discharge capacity was determined, and the average discharge capacity of the six batteries was calculated. The obtained average was set to initial discharge capacity (mAh). Charge and discharge were performed in a 20° C. environment.

The above charge and discharge were repeated 300 times in total, the discharge capacity at the 300th discharge was determined from the discharge voltage in accordance with the above, and the average discharge capacity of the six batteries was calculated. The ratio of the obtained average to the initial discharge capacity was calculated and was set to capacity retention (%).

(2) Diameter of Electrode Group and Cylindrical Section

The batteries evaluated for cycle characteristics were disassembled, followed by taking out wound electrode groups. From transverse cross-sectional photographs of the six electrode groups, cylindrical sections C were determined and the diameter of each of the electrode groups and the diameter of each of the cylindrical sections C were measured, followed by determining the average thereof.

(3) Presence or Absence of Buckling

From the transverse cross-sectional photographs taken in (2), the presence or absence of buckling in the electrode groups was confirmed.

(4) Length Ratio of Inner Non-Contact Region

The electrode group taken out of each battery evaluated for cycle characteristics was flattened, a positive electrode and a negative electrode were peeled off, and a separator was separated. In accordance with a method shown in FIG. 6, the length ratio (L/Ls) of an inner non-contact region to the separator in a winding direction was calculated.

(5) Placement of Electrolyte Solution

The negative electrode peeled off in (4) was cut along a winding axis direction such that a negative electrode mix layer was halved, whereby the negative electrode was divided into an inner peripheral-side negative electrode and an outer peripheral-side negative electrode. After being immersed in γ-butyrolactone, each of the halved negative electrodes was ultrasonically treated, whereby electrolyte solution components contained in the negative electrodes were extracted. Next, the concentration of each of low-volatility electrolyte solution components (herein, EC and $LiPF_6$) contained in the extract was determined. The concentration of EC was determined by gas chromatography and the concentration of $LiPF_6$ was determined by ICP emission spectroscopy.

An electrode group was taken out of a separately prepared battery unevaluated for cycle characteristics (after initial charge and discharge). Subsequently, the concentrations of EC and $LiPF_6$ contained in each of an inner peripheral-side negative electrode and an outer peripheral-side negative electrode were determined in a similar manner.

Example 1

In accordance with a procedure below, six cylindrical secondary batteries 100 were prepared as shown in FIG. 7.

(a) Preparation of Positive Electrode

To 100 parts by mass of lithium cobaltate serving as a positive electrode active material, four parts by mass of acetylene black serving as a conductive agent, and four parts by mass of PVdF serving as a binding agent, NMP serving as a dispersion medium was added, followed by mixing, whereby positive electrode slurry was prepared. The positive electrode slurry was applied to both surfaces of aluminum foil (a thickness of 15 μm) serving as a positive electrode current collector and was dried, followed by compressing in a thickness direction, whereby a positive electrode 11 (a thickness of 0.08 mm) was prepared. A region (a first exposed section 111*a*) having no positive electrode mix layers 112 was provided in the positive electrode 11 in preparation and one end section of a ribbon-shaped positive electrode lead (a width of 1.0 mm and a thickness of 0.05 mm) was connected to the first exposed section 111*a*.

(b) Preparation of Negative Electrode

A mixture obtained by mixing 100 parts by mass of a synthetic graphite powder serving as a negative electrode active material, one parts by mass of a styrene-methacrylic acid-butadiene copolymer (SBR) serving as a binding agent, and one parts by mass of CMC serving as a thickening agent together was dispersed in deionized water, whereby non-aqueous electrolyte slurry was prepared. The negative electrode slurry was applied to both surfaces of copper foil (a thickness of 6 μm) serving as a negative electrode current collector 121 and was dried, followed by compressing in a thickness direction, whereby a negative electrode 12 (a thickness of 0.11 mm) was prepared. Regions (a second exposed section 121*a* and a third exposed section 121*b*) having no negative electrode mix layers 122 were provided in the negative electrode 12 in preparation. One end section of a ribbon-shaped negative electrode current-collecting lead 70 (a width of 1.5 mm and a thickness of 0.1 mm) was connected to the second exposed section 121*a*.

(c) Preparation of Separator

The following separator was prepared: a separator 13 (a thickness of 12 μm) including a base layer 131 composed of a polyethylene microporous membrane (a thickness of 9 μm) and resin layers 132, formed over both surfaces of the base layer 131, containing a copolymer of HPF and VdF.

(d) Preparation of Electrode Group

The separator 13 was inserted into a slit portion formed in a core 200 (a columnar shape with a diameter of 1.2 mm). Next, the separator 13, the positive electrode 11, and the negative electrode 12 were arranged as shown in FIG. 4. In this state, the positive electrode 11, the negative electrode 12, and the separator 13 were wound around the core 200, whereby a wound electrode group 10 was formed. The core was removed by slightly relaxing winding and a fixing insulating tape 14 was attached to a winding end, whereby the electrode group 10 was fixed. The number of turns in the electrode group 10 was set to four to six.

In the obtained electrode group 10, the third exposed section 121*b* of the negative electrode current collector 121 was placed at an end section on the inner peripheral side. The separator 13 (an inner non-contact region 13*c*), which included the resin layers 132 and of which both surfaces were not in contact with the negative electrode mix layers 122, was placed on the inner peripheral side of the electrode group 10. The outside of the separator 13 that was located on the outermost peripheral side of the electrode group 10 was covered by the negative electrode current collector 121.

(e) Preparation of Electrolyte Solution

An electrolyte solution was prepared by dissolving $LiPF_6$ in a solvent mixture containing EC and DEC at a mass ratio of 1:1. In this operation, the concentration of $LiPF_6$ in the electrolyte solution was set to 1.0 mol/L.

(f) Preparation of Cylindrical Lithium Ion Secondary Battery

The electrode group 10 obtained in (d) was inserted into a bottomed cylindrical battery case 20 (an outside diameter of 4.6 mm), formed from a nickel-plated iron plate, having an opening. Another end section of the negative electrode current-collecting lead 70 was connected to an inside wall of the battery case 20 at a weld 70*a* by welding. The weld 70*a* was located closer to the opening of the battery case 20 than an upper end surface of the electrode group 10. A first insulating ring 50A was provided on an upper portion of the electrode group 10. Another end section of a positive electrode current-collecting lead 60 extended from the electrode group 10 was connected to the bottom surface of a sealing member 40 through a hole in the first insulating ring 50A. In this operation, a ring-shaped insulating gasket 30 was mounted on a peripheral portion of the sealing member 40. Into the battery case 20, 68 μL (2.1 μL per a discharge capacity of 1 mAh) of the electrolyte solution prepared in (e) was poured. The sealing member 40, which was nickel-plated and was made of iron, was provided on the opening of the battery case 20 and an opening end section of the battery case 20 was swaged to the peripheral portion of the sealing member 40 with the gasket 30 therebetween, whereby the battery case 20 was sealed.

Butyl rubber-based insulating paint was applied in a doughnut pattern so as to cover an outer surface of the opening end section of the battery case 20 and a surface of the gasket 30 therearound, whereby a second insulating ring 50B was formed.

In this manner, cylindrical lithium ion secondary batteries 100 with a nominal capacity of 35.0 mAh were obtained. Evaluation results are shown in Table 1. The diameter of the electrode group 10 was 3 mm. The diameter of the cylindrical section C was about 1.3 mm.

Comparative Example 1

Cylindrical secondary batteries were prepared in substantially the same manner as that used in Example 1 except that the length ratio of an inner non-contact region was 3%. The cylindrical secondary batteries were evaluated. Results are shown in Table 1.

TABLE 1

| | Example 1 | | Comparative Example 1 | |
|---|---|---|---|---|
| (1) Capacity retention after cycle test | 83% | | 41% | |
| (3) Presence or absence of buckling after cycle test | Absent | | Present | |
| (4) Length ratio of inner non-contact region | 7% | | 3% | |
| (5) Placement of electrolyte solution (inner peripheral side/outer peripheral side) | Before cycle test | After cycle test | Before cycle test | After cycle test |
| Content of EC (mass percent) | 7.2/7.7 | 6.9/7.4 | 5.8/6.2 | 4.2/6.7 |
| Content of LiP$_6$ (mass percent) | 3.4/3.4 | 4/3.9 | 2.8/2.9 | 2.4/3.8 |

As shown in Table 1, in Example 1, the capacity retention was very high and no buckling was observed. This is probably because a sufficient amount of the electrolyte solution continued to be held on the inner peripheral side of an electrode group because of an inner non-contact region of a separator. This is indicated by the fact that there is no large difference in the amount of the electrolyte solution contained in a negative electrode between the inner peripheral side and the outer peripheral side before and after charge and discharge. However, in Comparative Example 1, the capacity retention was lower than that in Example 1 and the buckling of an electrode group was observed. Furthermore, there was a large difference in the amount of the electrolyte solution contained in a negative electrode between the inner peripheral side and the outer peripheral side after charge and discharge and the electrolyte solution was unevenly distributed on the outer peripheral side.

Example 2

Six cylindrical secondary batteries were prepared in substantially the same manner as that used in Example 1 except that, for negative electrode mix layers, a thickening agent (CMC) was changed to NMP and a binding agent (SBR) was changed to PVdF. The cylindrical secondary batteries were evaluated. Results of Evaluations (1), (3), and (4) are shown in Table 2.

Comparative Example 2

Six cylindrical secondary batteries were prepared in substantially the same manner as that used in Comparative Example 1 except that, for negative electrode mix layers, a thickening agent (CMC) was changed to NMP and a binding agent (SBR) was changed to PVdF. The cylindrical secondary batteries were evaluated. Results of Evaluations (1), (3), and (4) are shown in Table 2.

TABLE 2

| | Example 2 | Comparative Example 1 |
|---|---|---|
| (1) Capacity retention after cycle test | 85% | 61% |
| (3) Presence or absence of buckling after cycle test | Absent | Present |
| (4) Length ratio of inner non-contact region | 7% | 3% |

In Example 2, as well as Example 1, high charge-discharge cycle characteristics were obtained. However, in Comparative Example 2, the capacity retention is inferior to that in Example 2, though the capacity retention is higher than that in Comparative Example 1. In Example 2 and Comparative Example 2, the negative electrode mix layers contain PVdF, which has swelling properties for the electrolyte solution. However, it is clear that a very high capacity retention of more than 80% cannot be achieved using a swelling resin contained in a negative electrode mix layer.

INDUSTRIAL APPLICABILITY

A cylindrical secondary battery according to an embodiment of the present invention is compact and lightweight and has particularly excellent charge-discharge cycle characteristics in association with quick charge. Therefore, the cylindrical secondary battery can be successfully used as a power supply for various electronic devices, particularly various portable electronic devices (including glasses (3D glasses and the like), hearing aids, stylus pens, and wearable terminals) requiring a compact power supply.

The present invention has been described with reference to embodiments that are preferable at present. Such a disclosure should not be construed as limitative. Various variations and modifications will surely become apparent for those skilled in a technical field belonging to the present invention by reading the above disclosure. Accordingly, the appended claims should be construed as encompassing all variations and modifications without departing from the true spirit and scope of the present invention.

REFERENCE SIGNS LIST

10: Wound electrode group
P10: Unwound electrode group
C: Cylindrical section
11: Positive electrode
111: Positive electrode current collector
111a: First exposed section
111b: End surface of second end section
112: Positive electrode mix layers
12: Negative electrode
12X: Third principal surface
12Y: Fourth principal surface
121: Negative electrode current collector
121a: Second exposed section
121b: Third exposed section
121c, 121d: End surface
122: Negative electrode mix layers
13: Separator
13X: First principal surface
13Y: Second principal surface
13a, 13b: End section of separator
13c: Inner non-contact region 131: Base layer
132: Resin layers
14: Fixing insulating tape
100: Cylindrical secondary battery
20: Battery case
30: Gasket
40: Sealing member
40a: Brim
40b, 40c: Terminal section
50A: First insulating ring
50B: Second insulating ring
60: Positive electrode current-collecting lead
70: Negative electrode current-collecting lead
70a: Weld
200: Core

The invention claimed is:

1. A cylindrical secondary battery comprising: a bottomed cylindrical battery case having an opening;
an electrode group; an electrolyte solution, the electrode group and the electrolyte solution being housed in the battery case; and
a sealing member blocking the opening of the battery case, wherein:
the electrode group includes a positive electrode, a negative electrode, and a separator placed between the positive electrode and the negative electrode and is formed by winding the positive electrode and the negative electrode with the separator therebetween,
the negative electrode includes a negative electrode current collector and a negative electrode mix layer formed on at least one principal surface of the negative electrode current collector,
the positive electrode includes a positive electrode current collector and a positive electrode mix layer formed on at least one principal surface of the positive electrode current collector,
the separator includes an inner non-contact region which is located on the inner peripheral side of the electrode group,
both surfaces of the inner non-contact region of the separator are not in contact with the negative electrode mix layer and not in contact with the positive electrode mix layer,
the length of the inner non-contact region is 5% or more of the length of the separator in a winding direction of the electrode group,
the electrode group includes a cylindrical section formed by the negative electrode mix layer formed on a principal surface of the negative electrode current collector that is located innermost in the electrode group,
the diameter of the cylindrical section is 0.7 mm or more and 2.5 mm or less, and
the cylindrical section has a hollow space that is at the center portion of the electrode group and is in direct contact with the negative electrode current collector.

2. The cylindrical secondary battery according to claim 1, wherein the inner non-contact region is placed in an inner portion of the cylindrical section.

3. The cylindrical secondary battery according to claim 1, wherein the separator has a first folded portion in the inner non-contact region.

4. The cylindrical secondary battery according to claim 3, wherein the separator is folded at the first folded portion to sandwich a portion of the negative electrode.

5. The cylindrical secondary battery according to claim 1, wherein the negative electrode includes an exposed section where at least one principal surface of the negative electrode current collector is exposed and which is located at an end section on the inner peripheral side of the electrode group.

6. The cylindrical secondary battery according to claim 5, wherein the exposed section is placed in an inner portion of the cylindrical section.

7. The cylindrical secondary battery according to claim 5, wherein the exposed section has a second folded portion placed in the inner portion of the cylindrical section.

8. The cylindrical secondary battery according to claim 7, wherein the exposed section is folded at the second folded portion together with the separator in the inner non-contact region.

9. The cylindrical secondary battery according to claim 5, wherein the negative electrode mix layer formed on a principal surface of the negative electrode current collector that is located innermost of the electrode group faces the exposed section with a plurality of the separator therebetween.

10. The cylindrical secondary battery according to claim 1, wherein the separator includes a base layer and a resin layer formed on at least one principal surface of the base layer and the resin layer contains resin having swelling properties for the electrolyte solution.

11. The cylindrical secondary battery according to claim 1, wherein the outside of the separator that is located on the outermost peripheral side of the electrode group is covered by the negative electrode current collector.

12. The cylindrical secondary battery according to claim 1, wherein the outside diameter of the cylindrical secondary battery is 6.5 mm or less.

13. The cylindrical secondary battery according to claim 1, wherein the number of turns in the electrode group is three to ten.

14. The cylindrical secondary battery according to claim 1, wherein the inner non-contact region of the separator traverses the hollow space to partition the hollow space.

15. The cylindrical secondary battery according to claim 6, wherein the hollow space is in direct contact with the exposed portion of the negative electrode current collector.

* * * * *